United States Patent [19]
Horigome et al.

[11] Patent Number: 5,712,837
[45] Date of Patent: Jan. 27, 1998

[54] METHOD AND APPARATUS FOR RECORDING DATA

[75] Inventors: Toshihiro Horigome; Seiji Kobayashi, both of Kanagawa; Joost De Kock, Tokyo, all of Japan

[73] Assignee: Sony Corporation, Tokyo, Japan

[21] Appl. No.: 573,991

[22] Filed: Dec. 18, 1995

[30] Foreign Application Priority Data

Dec. 20, 1994 [JP] Japan ..................... 6-316319

[51] Int. Cl.$^6$ ........................................... G11B 7/00
[52] U.S. Cl. ........................ 369/59; 369/58; 369/47
[58] Field of Search ........................ 369/59, 58, 54, 369/50, 47, 48, 49, 109, 110, 116, 53, 32

[56] References Cited

U.S. PATENT DOCUMENTS 5,533,003  7/1996  Kobayashi ..................... 369/58

Primary Examiner—Muhammad N. Edun
Attorney, Agent, or Firm—William S. Frommer; Alvin Sinderbrand

[57] ABSTRACT

A method and an apparatus arranged to record data at a higher density. Learning data generated by a learning data generating circuit is recorded on a disc and is actually reproduced by a player to measure inter-code interference in the learning data by an inter-code interference measuring section. In a pre-emphasis correction value calculating section, a pre-emphasis correction value corresponding to the measured inter-code interference is calculated. The result of this calculation is recorded as a table in a ROM of a recording edge position calculating circuit. The recording edge position calculating circuit processes recording data output from an information source in accordance with the table recorded in this ROM.

6 Claims, 13 Drawing Sheets

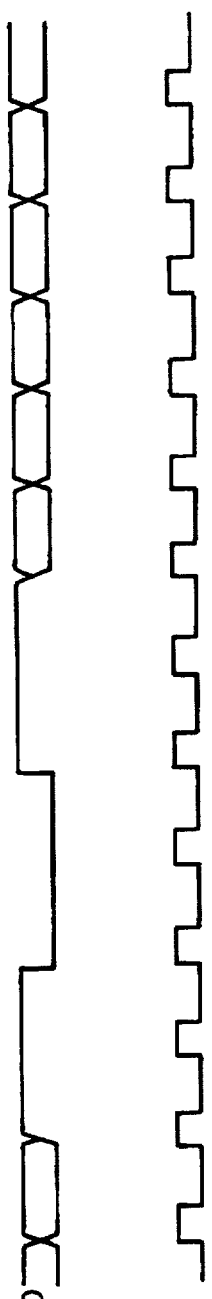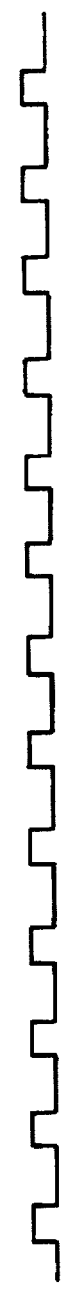
FIG.12(a) RF
FIG.12(b) REPRODUCED DATA
FIG.12(c) CLOCK A
FIG.12(d) CLOCK B
FIG.12(e) BIAS CORRECTION OUTPUT
FIG.12(f) CLOCK C
FIG.12(g) GAIN CORRECTION OUTPUT

METHOD AND APPARATUS FOR RECORDING DATA

BACKGROUND OF THE INVENTION

(1) Field of the Invention

The present invention relates to a data recording method and a data recording apparatus suitable for recording data on a recording medium such as an optical disc or a magneto-optical disc.

(2) Description of the Related Art

The applicant of the present invention has already proposed, in Japanese Patent Application No. 207074/1992, for example, a method of recording data by changing the position of edges of recording pits in a step manner according to data to be recorded. According to this method, the position of the rise (leading) edge or fall (trailing) edge of each pit formed in a recording medium such as an optical disc or a magneto-optical disc is selectively set to one of eight positions according to data to be recorded, thereby recording digital data on the recording medium.

To record data at a higher density in such digital data recording based on changing the edge position of pits in a step manner, it is necessary to minimize the step width. However, if the step width is smaller, inter-code interference becomes so large as to make it difficult to maintain high data reproducing accuracy.

The applicant of the present invention has then proposed, in the specification of Japanese Patent Application No. 300470/1992, for example, a method of predicting inter-code interference and correcting the pit edge position so that the inter-code interference is canceled.

That is, in this method, the position of each of pit edges is basically determined as one of eight macro steps (the width of which is changed by a pitch of, for example, 0.04 µm), as indicated by numbers 0 to 7 in FIG. 1, and the position of each edge is changed between the positions of 256 micro steps having a much smaller step width. This method makes it possible to reduce the range of change in edge position so that the density of recorded data becomes higher.

In the invention disclosed in the specification of Japanese Patent Application No. 300470/1992, inter-code interference is determined by using a simulation model and the micro step position of each edge (amount of correction) is determined so as to correct the inter-code interference determined through the simulation model.

Inter-code interference, however, cannot be accurately determined by using a simulation model, so that the accuracy of limitation or cancellation of inter-code interference cannot be increased. Thus, it is difficult to perform high-density recording.

SUMMARY OF THE INVENTION

In view of these circumstances, an object of the present invention is to provide a method and an apparatus for recording data at a higher density by limiting inter-code interference more accurately.

To achieve this object, according to one aspect of the present invention, there is provided a method of recording data on a recording medium by changing the position of each of edges of recording pits in a step manner by a first step width according to the data to be recorded and by correcting the position of the edge having the first step width by a second step width smaller than the first step width so that inter-code interference is reduced, the method including the steps of reproducing data recorded on the recording medium, calculating inter-code interference in the data reproduced from the recording medium, calculating an amount of correction of the edge by the second step width for reducing the inter-code interference, and recording data on the recording medium by using the amount of correction calculated.

The steps of correcting the edge position and recording the data may be repeated until the inter-code interference becomes smaller than a predetermined reference value previously set.

At least the amount of correction calculated the first time may be set to a value smaller than the amount of correction in accordance with the calculated inter-code interference.

At the first time, learning data which determines a combination pattern of the position of a predetermined one of the edges at the edge positions having the first step width and the positions of at least two adjacent edges before and after the predetermined one of the edges may be recorded on the recording medium. This learning data is reproduced to calculate the amount of correction.

The step of calculating the inter-code interference may be repeated a certain number of times with respect to one combination pattern to obtain an average value of inter-code interference which is used as the value of the inter-code interference.

According to another aspect of the invention, there is provided an apparatus for recording data on a recording medium by changing the position of each of edges of pits in a step manner by a first step width according to the data to be recorded and by correcting the position of the edge having the first step width by a second step width smaller than the first step width so that inter-code interference is reduced. The apparatus has reproduction means for reproducing data recorded on the recording medium (e.g., a pickup 82 shown in FIG. 5), inter-code interference calculation means for calculating inter-code interference in the data reproduced from the recording medium (e.g., an inter-code interference measuring section 21 shown in FIG. 1), correction amount calculation means for calculating an amount of correction of the edge by the second step width such that the inter-code interference becomes smaller (e.g., a pre-emphasis correction value calculating section 22 shown in FIG. 1), storage means for storing the amount of correction calculated (e.g., a ROM 18 shown in FIG. 1), and recording means for recording data on the recording medium by using the amount of correction stored (e.g., a mastering system 4 shown in FIG. 10).

In the data recording method and the data recording apparatus described above, data is actually recorded on the recording medium, inter-code interference in the data reproduced from the medium is calculated, and the amount of correction using micro steps is calculated so that the inter-code interference is minimized. Therefore, the inter-code interference can be reduced more accurately, enabling recording at a higher density.

BRIEF DESCRIPTION OF THE DRAWINGS

FIGS. 12(a)–12(g) are timing chart of the operation of the player 6 shown in FIG. 6.

DESCRIPTION OF THE PREFERRED EMBODIMENT

Figure 2:
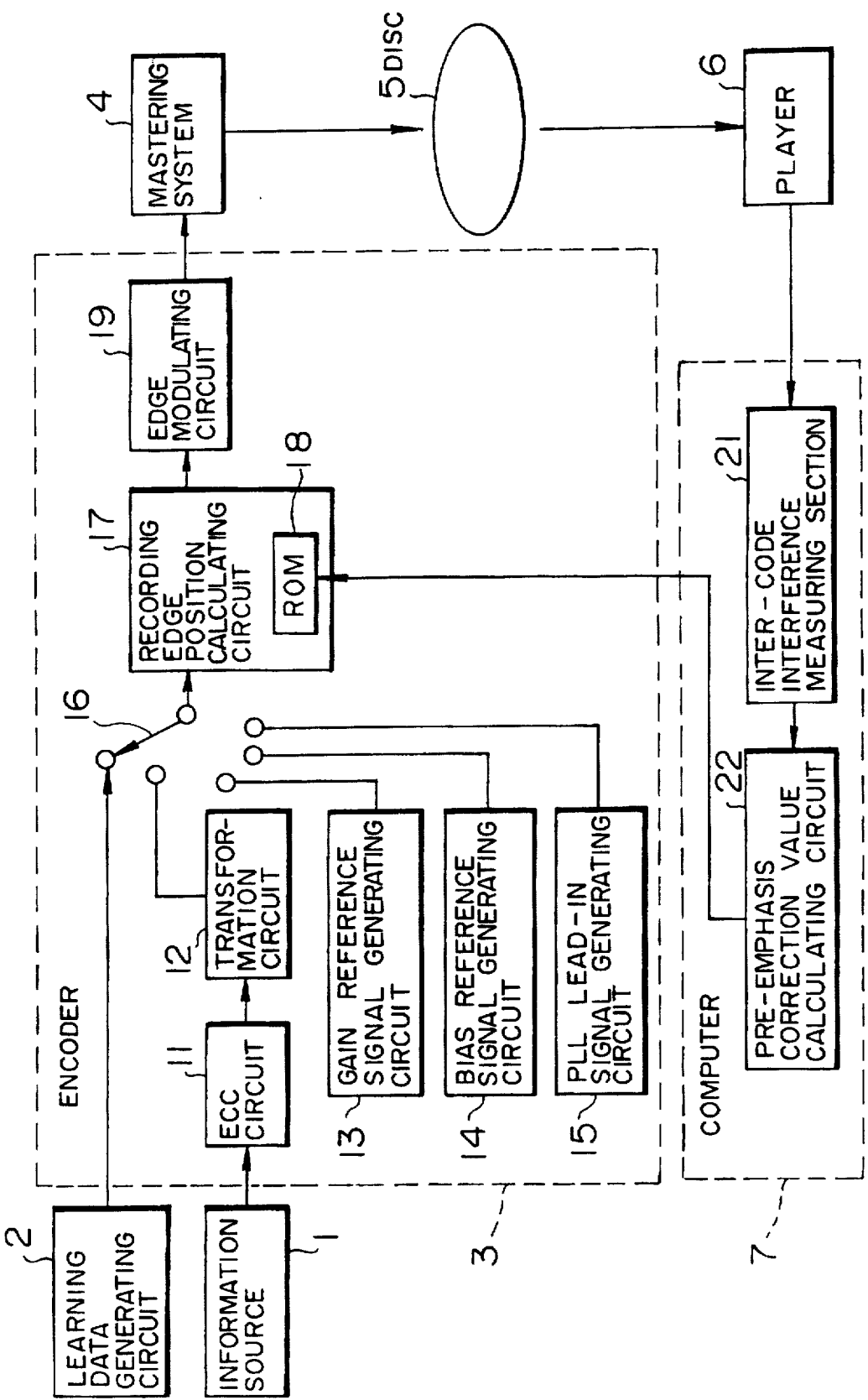
FIG. 2 is a block diagram showing the configuration of an embodiment of a data recording apparatus in accordance with the present invention.

FIG. 2 is a block diagram showing the configuration of an embodiment of a data recording apparatus in accordance with the present invention. In this embodiment, recording data which is output from an information source 1 or learning data which is output from a learning data generating circuit 2 is supplied to an encoder 3, and data encoded by the encoder 3 is supplied to a mastering system 4 and recorded on a disc 5. Data recorded on the disc 5 is reproduced by a player 6, and a computer 7 is supplied with the reproduced data and calculates inter-code interference and a corresponding amount of correction of macro steps.

In the encoder 3, recording data (digital data) supplied from the information source 1 is input to an error checking and correction (ECC) circuit 11, and error checking and correction codes are added to the recording data. The recording data is thereafter supplied to a transformation circuit 12. The data input to the transformation circuit 12, having an 8-bit unit, is transformed into data having a 3-bit unit.

A switch 16 selects one of 3-bit learning data which is output from the learning data generating circuit 2, recording data which is transformed into 3-bit data by the transformation circuit 12 and output from the same, gain reference signal data which is output from a gain reference signal generating circuit 13, bias reference signal data which is output from a bias reference signal generating circuit 14, and phase-lock-loop (PLL) lead-in signal data which is output from a phase-lock-loop (PLL) lead-in signal generating circuit 15. The data selected by the switch 16 is supplied to a recording edge position calculating circuit 17.

The recording edge position calculating circuit 17 determines macro steps corresponding to recording data in accordance with a table stored in its internal read-only memory (ROM) 18, and outputs data corresponding to the macro steps to an edge modulating circuit 19. The edge modulating circuit 19 generates signals representing the positions of the edges corresponding to the macro steps supplied from the recording edge position calculating circuit 17 and supplies the edge position signals to the mastering system 4.

On the other hand, in the computer 7, an inter-code interference measuring section 21 measures inter-code interference from the reproduced data supplied from the player 6 and outputs the result of this measurement to a pre-emphasis correction value calculating section 22, which calculates the micro-step positions of the edges (amount of correction) according to the measurement result from the inter-code interference measuring section 21. The table in the ROM 18 of the recording edge position calculating circuit 17 is updated so that the result of this calculation is reflected in the table.

Figure 3:
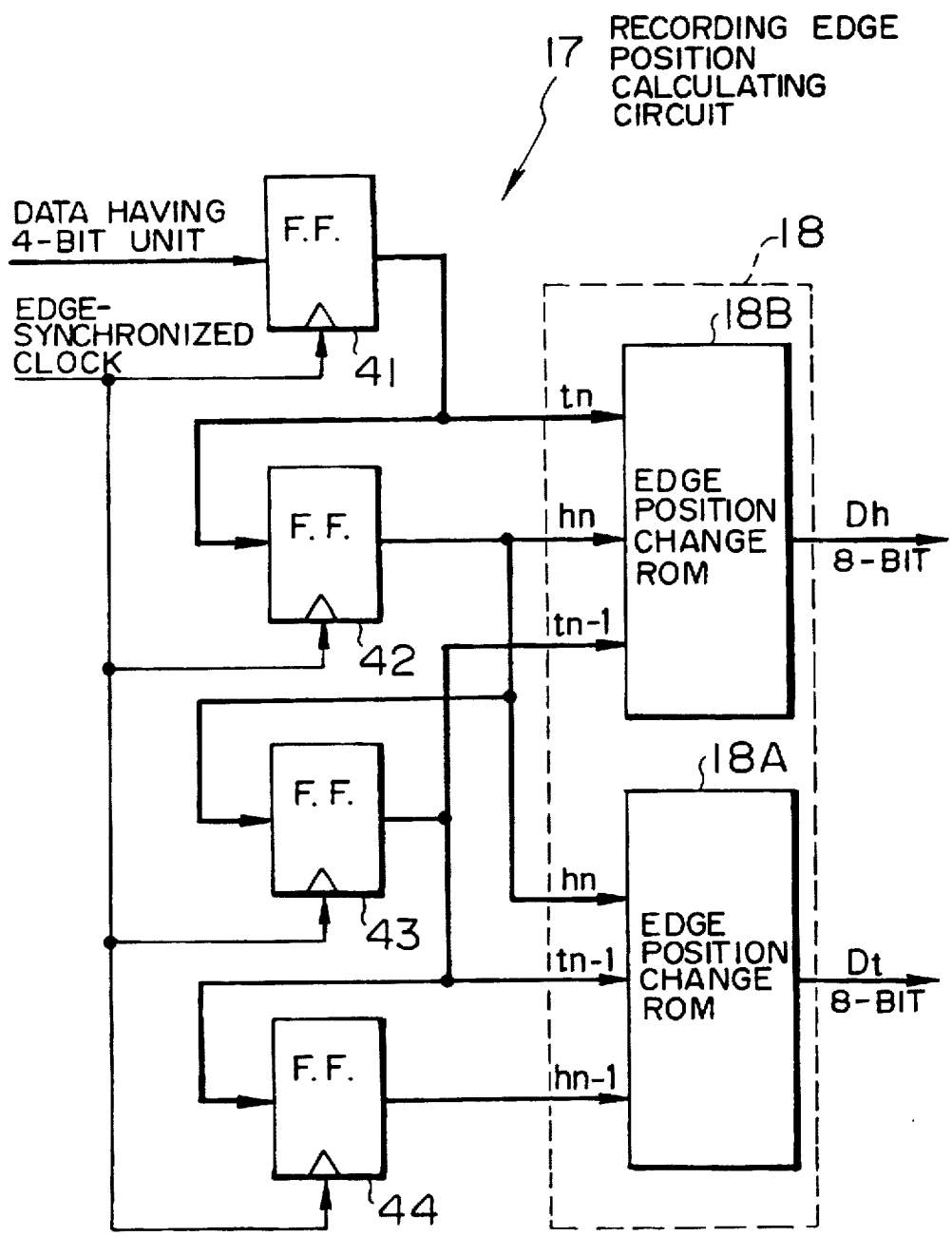
FIG. 3 is a block diagram showing an example of the configuration of a recording edge position calculating circuit 17 shown in FIG. 2.

The recording edge position calculating circuit 17 is formed of, for example, as shown in FIG. 3, flip flops 41 to 44 in a four-stage series connection, and edge position change ROMs 18A and 18B which form the ROM 18.

The switch 16 adds one bit "0" as a most significant bit to the 3-bit data supplied from the learning data generating circuit 2, the transformation circuit 12, the gain reference signal generating circuit 13, the bias reference signal generating circuit 14, or the PLL lead-in signal generating circuit 15 to form data having four-bit unit, and supplies this data to the recording edge position calculating circuit 17. This four-bit data is successively transferred to and held in the flip flops 41 to 44 on the basis of a clock generated in synchronization with edges.

Figure 4:
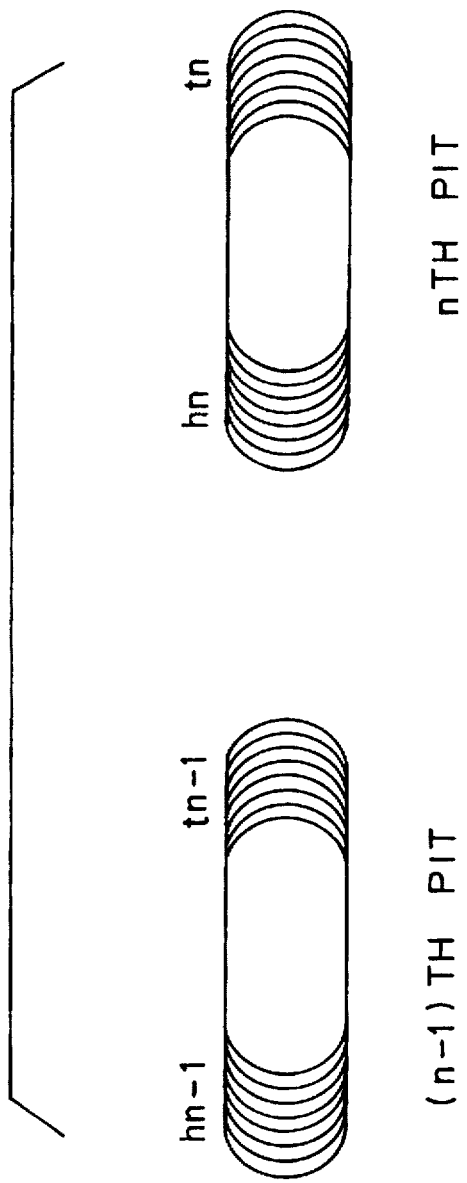
FIG. 4 is a diagram of edge positions of data stored in edge position change ROMs 18A and 18B shown in FIG. 3.

It is assumed here that, as shown in FIG. 4, data items representing the rise and fall edges of the (n−1)th pit are $h_{n-1}$ and $t_{n-1}$, respectively, and that data items representing the rise and fall edges of the nth pit are $h_n$ and $t_n$, respectively. Then, $h_n$, $t_{n-1}$ and $h_{n-1}$ are held by the flip flops 42 to 44 when $t_n$ is held by the flip flop 41.

Data $h_n$ of the rise edge of the nth pit and data $t_{n-1}$ and $t_n$ of the edges before and after this rise edge are input to the edge position change ROM 18B while data $t_{n-1}$ of the fall edge of the (n−1)th pit and data $h_{n-1}$ and $h_n$ of the edges before and after this fall edge are input to the edge position change ROM 18A.

Three position information items, i.e., the data of the center edges and the data on the adjacent preceding and subsequent edges, are input to the edge position change ROM 18B. From these position information items, the positions represented by micro steps for reducing inter-code interference are determined to be output as 8-bit data $D_t$ and $D_h$.

Figure 5:
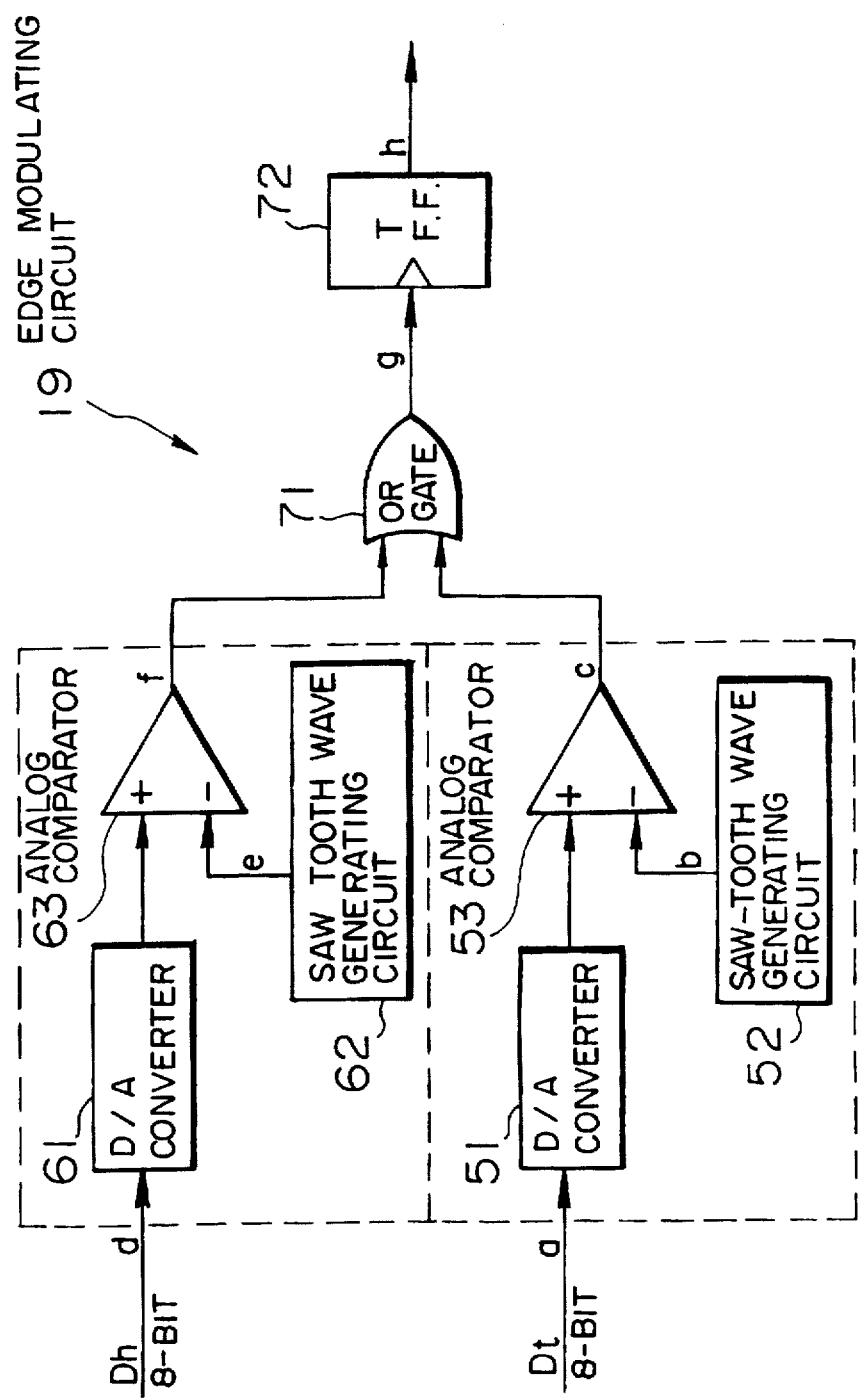
FIG. 5 is a block diagram showing an example of the configuration of an edge modulating circuit 19 shown in FIG. 2.

FIG. 5 shows an example of the configuration of the edge modulating circuit 19. In this example are provided a D/A converter 51 for digital-to-analog conversion of data Dt output from the edge position change ROM 18A of the recording edge position calculating circuit 17, and an analog comparator 53 for comparing the output from the D/A converter 51 with a saw-tooth wave output from a saw-tooth wave generating circuit 52. There are also provided a D/A converter 61 for digital-to-analog conversion of data Dh output from the edge position change ROM 18B, and an analog comparator 63 for comparing the output from the D/A converter 61 with a saw-tooth wave output from a saw-tooth wave generating circuit 62. Further, an OR gate 71 calculates the logical sum of the outputs from the analog comparators 53 and 63 and outputs the calculated logical sum to a T flip flop 72.

Figure 6:
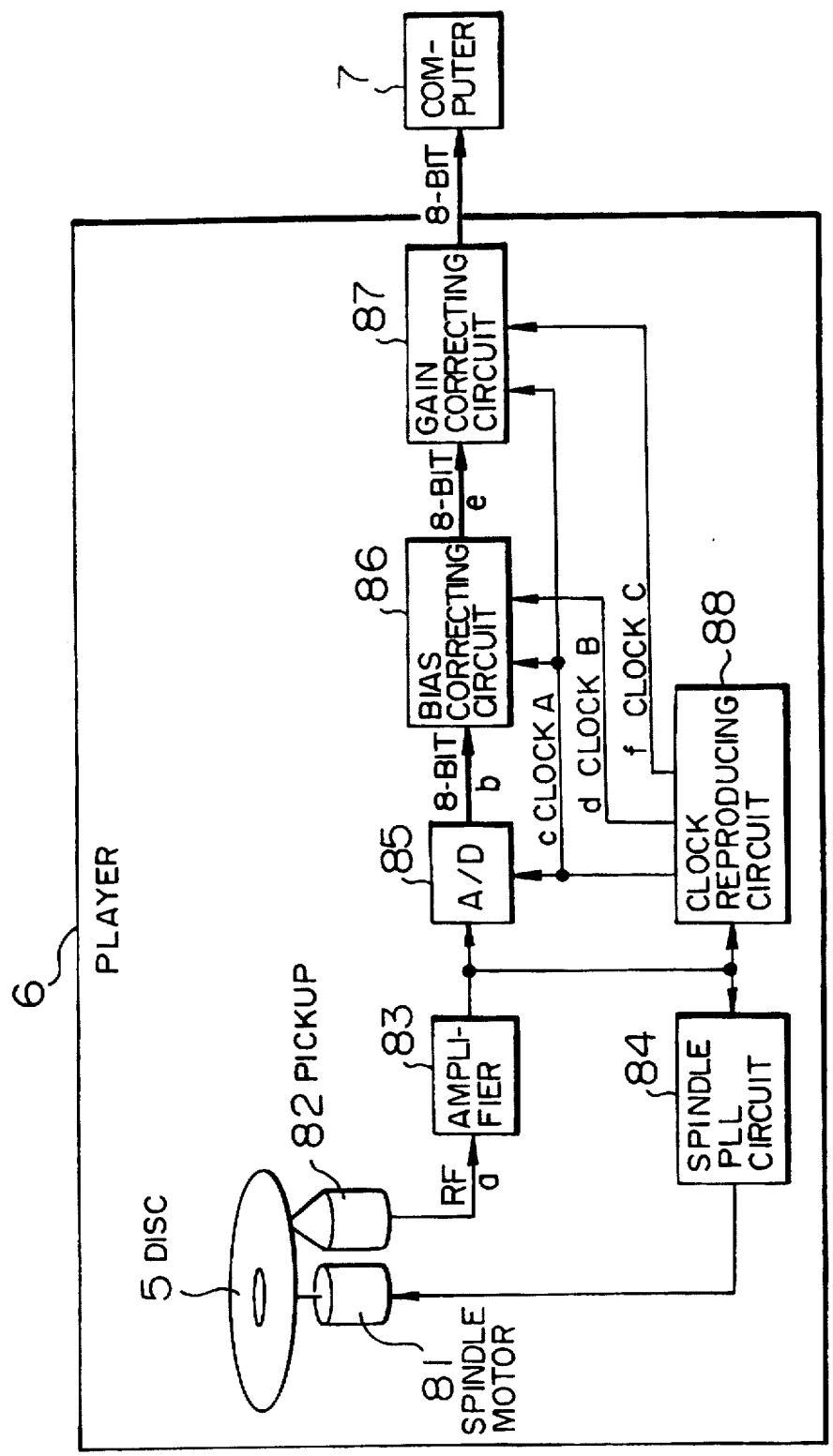
FIG. 6 is a block diagram showing an example of the configuration of a player 6 shown in FIG. 2.

FIG. 6 shows an example of the configuration of the player 6. A disc 5 is rotated at a predetermined speed by a spindle motor 81. A pickup 82 irradiates the disc 5 with laser light, forms a radio-frequency (RF) signal corresponding to data recorded on the disc 5 from reflected light from the disc 5, and outputs the RF signal. An amplifier 83 amplifies the RF signal and outputs the RF signal to an A/D converter 85, a spindle phase-lock-loop (PLL) circuit 84 and a clock reproducing circuit 88.

The spindle PLL circuit 84 extracts a PLL lead-in signal from the input signal, forms a control signal synchronized with the PLL lead-in signal, and supplies the control signal to the spindle motor 81. The clock reproducing circuit 88 extracts the PLL lead-in signal from the input signal, and forms clocks A, B and C in synchronization with the PLL lead-in signal. The clock reproducing circuit 88 supplies clock A to the A/D converter 85, a bias correcting circuit 86 and a gain correcting circuit 87, and supplies clocks B and C to the bias correcting circuit 86 and the gain correcting circuit 87, respectively.

The data converted from the analog form into the digital form by the A/D converter 85 is bias-corrected by the bias correcting circuit 86 and is thereafter input to the gain correcting circuit 87 to be gain-corrected. The data gain-corrected by the gain correcting circuit 87 is output to the computer 7.

Figure 7:
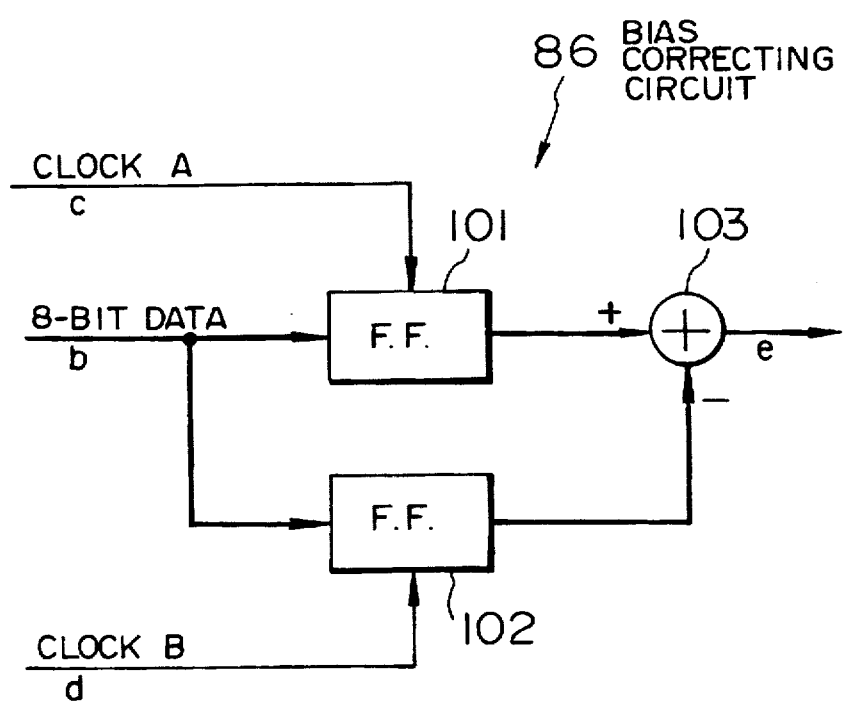
FIG. 7 is a block diagram showing an example of the configuration of a bias correcting circuit 86 shown in FIG. 6.

FIG. 7 shows an example of the configuration of the bias correcting circuit 86 of the player 6. In this example, 8-bit data input from the A/D converter 85 is supplied to flip flops 101 and 102. Clock A is input to the flip flop 101. Clock A is generated when each of the rise and fall edges is generated. Therefore, data at each edge position is held by the flip flop 101.

Clock B generated when bias correction data is generated is input to the flip flop 102. Accordingly, bias correction data is held by the flip flop 102. An adder 103 subtracts the output of the flip flop 102 from the output of the flip flop 101 and outputs the result of this addition.

Figure 8:
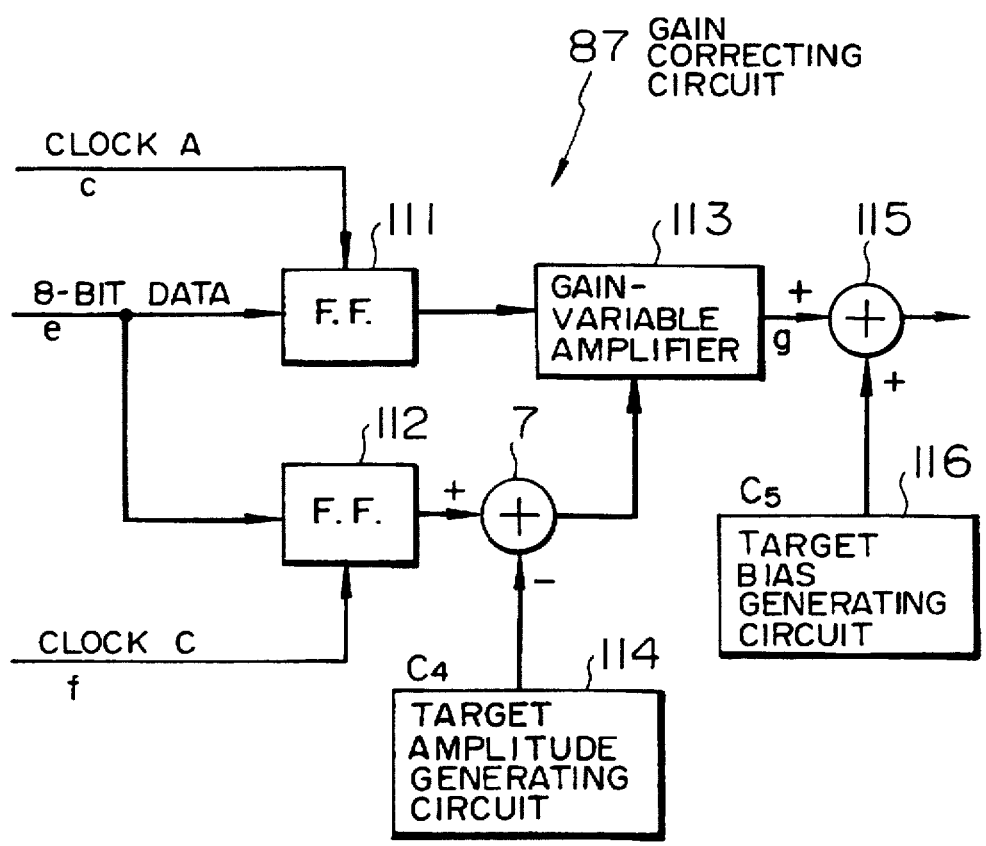
FIG. 8 is a block diagram showing an example of the configuration of a gain correcting circuit 87 shown in FIG. 6.

FIG. 8 shows an example of the configuration of the gain correcting circuit 87. In this example, 8-bit data input from the adder 103 of the bias correcting circuit 86 is input to flip flops 111 and 112. The flip flop 111 holds data at each edge position in the input data in synchronization with clock A. The flip flop 112 latches gain correction signal data in the input 8-bit data in synchronization with clock C generated by the same timing as the generation of gain correction signal data.

The adder 7 subtracts, from the output of the flip flop 112, a target amplitude signal ($C_4$) output from a target amplitude generating circuit 114 and outputs the result of this subtraction to a gain-variable amplifier 113. The gain-variable amplifier, having a ROM or the like, adjusts the gain of data input from the flip flop 111 to a predetermined value according to the output of the adder 7, and outputs the data to an adder 115. The adder 115 adds a target bias signal ($C_5$) output from a target bias generating circuit 116 to the output of the gain-variable amplifier 113, and outputs the result of this addition to the computer 7.

The operation of the above-described embodiment will be described with reference to the flowchart of FIG. 9.

First, in step S1, processing for manufacturing disc 5 is executed. That is, 3-bit learning data generated by the learning data generating circuit 2 is converted into 4-bit data by the switch 16 and the 4-bit data is input to the flip flop 41 of the recording edge position calculating circuit 17. Data corresponding to pit edges (rise edge and fall edge) is latched by the flip flop 41 because clock pulses corresponding to the edges are being supplied to the flip flop 41.

Learning data output from the learning data generating circuit 2 is determined so as to include all possible patterns formed by three successive edges of pits when the position of each edge is selected from the positions determined by eight macro steps.

That is, if inter-code interference between signals from adjacent two edges before and after a central edge should be canceled, one pattern (learning pattern) formed by the positions of three edges, i.e., the position of one central edge and the positions of two adjacent edges located before and after the central edge, is considered. The magnitude of inter-code interference of the central edge of the learning pattern is determined by the positions of the edges before and after the central edge. When the positions of each of the adjacent edges varies in a step manner between the positions determined by eight macro steps, there are eight variations of the magnitude of inter-code interference of the central edge according to the position of the edge before the central edge. With respect to each variation, there are further eight variations according to the position after the central edge. There are 64 (=8×8) variations in all.

Also, the position of the central edge changes basically between the positions determined by the eight macro steps. Further, the magnitude of inter-code interference varies according to the kind of the central edge, i.e., a rise edge or a fall edge of a pit. Consequently, there are 1024 (=2×8×64) variations of the magnitude of inter-code interference in all.

In this embodiment, learning data including all the 1024 learning patterns is generated by the learning data generating circuit 2.

Data on each edge including the 1024 learning patterns described above is held by the flip flop 41. The data held by the flip flop 41 is successively latched by the flip flops 42 to 44 in the subsequent stages.

When data $t_{n-1}$ of the fall edge of the (n−1)th pit shown in FIG. 4 in such data is supplied from the flip flop 43 to the edge position change ROM 18A as central edge data, data $h_n$ of the rise edge immediately after the central edge and data $h_{n-1}$ of the rise edge immediately before the central edge are input to the edge position change ROM 18A from the flip flops 42 and 44, respectively. These data items correspond to eight edge positions represented by the macro steps indicated by the numbers 0 to 7 in FIG. 1.

That is, if the 4-bit data (having "0" as a most significant bit) is 0000, it designates the macro step corresponding to the innermost edge position (indicated by the number 0). If the 4-bit data is 0111, it designates the outermost edge (indicated by the number 7).

The edge position change ROM 18A incorporates a conversion table corresponding to an equation described below and converts the input macro-step data into 8-bit (256-value) micro-step data in accordance with the conversion table.

$$Dt = C_1 \times t_{n-1} + C_3 \tag{1}$$

In this equation, the constant $C_1$ represents an initial value of the step width of the macro steps, and the constant $C_3$ represents an initial value of the size of the minimum pit.

Similarly, data $h_n$ of the rise edge of the nth pit, data $t_{n-1}$ of the fall edge immediately before this rise edge, and data $t_n$ of the fall edge immediately after the rise edge are input to the edge position change ROM 18B. A conversion table corresponding to an equation described below is stored in the edge position change ROM 18B.

$$Dh = C_1 \times h_n + C_2 \tag{2}$$

where $C_2$ is a constant representing an initial value of the size of the minimum pit, as is $C_3$.

The edge position change ROM 18B converts edge position data representing the edge positions of eight macro steps into 8-bit data Dh representing 256 micro steps by utilizing this table, and outputs the data Dh.

Figure 1:
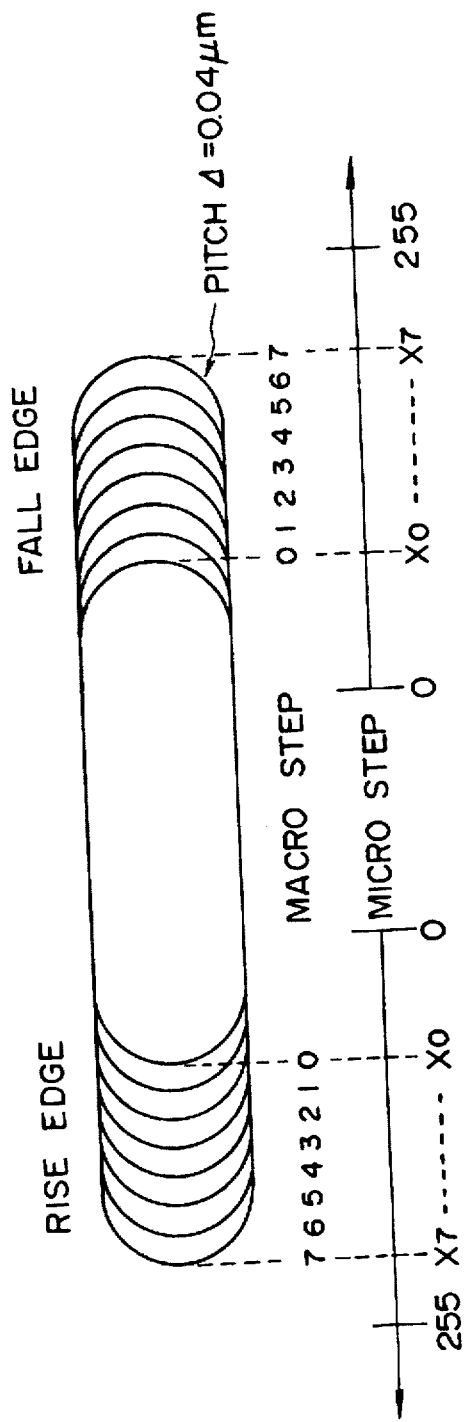
FIG. 1 is a diagram of the relationship between macro steps and micro steps.

Data for the PLL lead-in signal is such as to designate a position one macro step outside the position indicated by the number 7 in FIG. 1 (a position indicated by a number 8). If one of the three 4-bit data items $h_{n-1}$, $t_{n-1}$ and $h_n$ is "8" representing the PLL lead-in signal, the content stored with the corresponding address in the edge position change ROM 18A is not corrected by pre-emphasis.

Similarly, if one of the three 4-bit data items $t_{n-1}$, $h_n$ and $t_n$ is "8" representing the PLL lead-in signal, the content stored with the corresponding address in the edge position change ROM 18B is not corrected by pre-emphasis.

The PLL lead-in signal sets a reference position on which the edge positions of each pit are determined from the signal reproduced from disc 5 in the player 6. Therefore, it is necessary for the PLL lead-in signal to be always recorded at the same edge position. For this reason, the PLL lead-in signal is not corrected. As pits immediately before and after the PLL lead-in signal, fixed patterns, e.g., a bias reference signal and a gain reference signal, which represent data other than user data (learning data), are recorded. In this manner, the PLL lead-in signal is prevented from being affected by inter-code interference. That is, in this case, data based on macro steps are directly recorded.

The above-described learning data is recorded instead of essential recording data from the information source 1 in a trial manner for the purpose of overwriting predetermined values in the table stored in the ROM 18. Signals other than essential recording data, i.e., the gain reference signal (a signal representing the edge position corresponding to the macro step "7"), output from the gain reference signal generating circuit 13, the bias reference signal (a signal representing the edge position corresponding to the macro step "0"), output from the bias reference signal generating circuit 14, and the PLL lead-in signal (a signal representing the edge position corresponding to the macro step "8"), output from the PLL lead-in signal generating circuit 15, are also recorded along with the learning data by being time-base-multiplexed.

Figure 10:
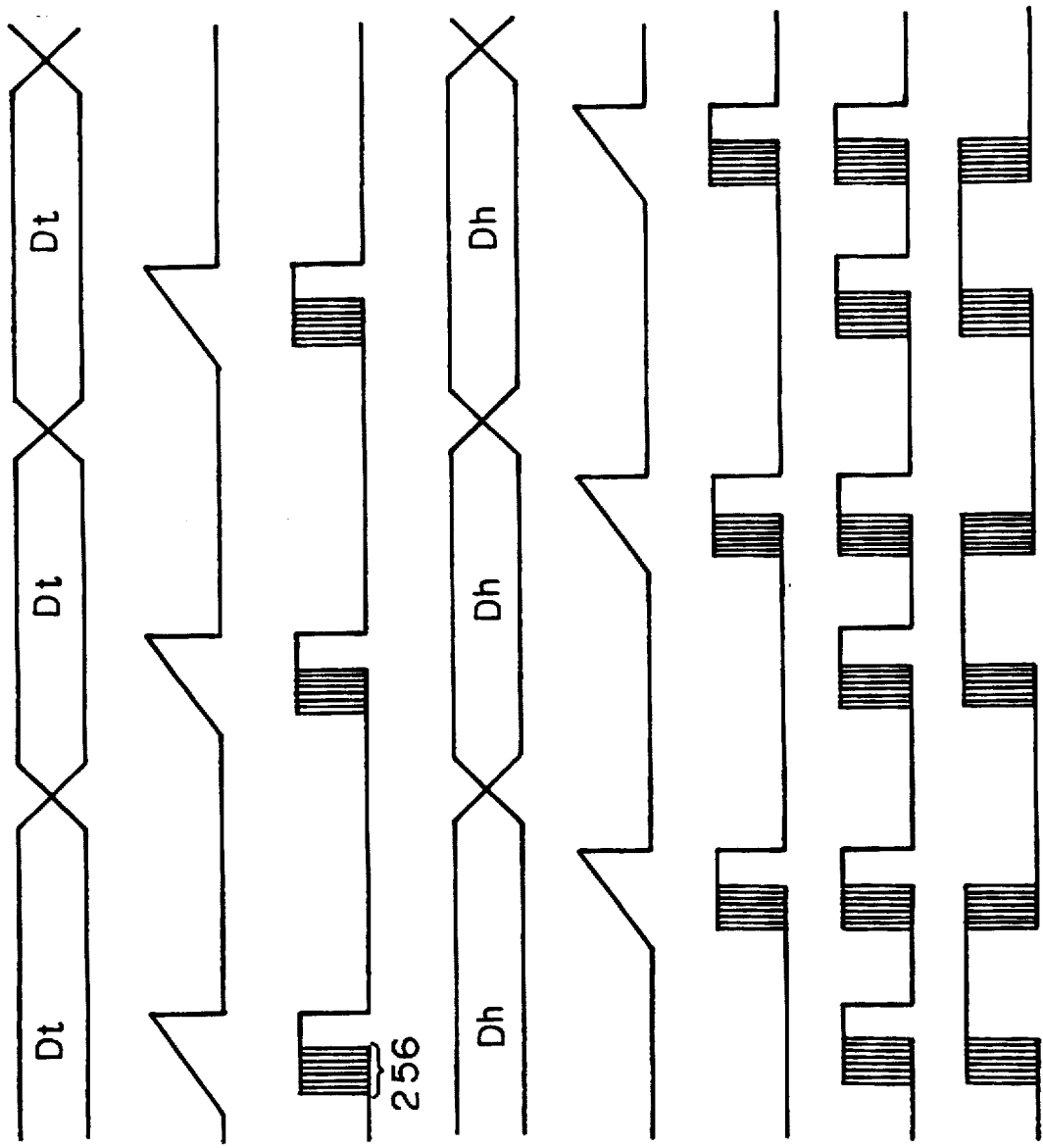
FIGS. 10(a)–10(h) are timing chart of the operation of the edge modulating circuit 19 shown in FIG. 5.

Data Dt (FIG. 10(a)) converted into data corresponding to some of the edge positions defined by 256 micro steps as described above is input to the D/A converter 51 of the edge modulating circuit 19. After D/A conversion, it is input to the non-inverting input terminal of the analog comparator 53 while a saw-tooth wave (FIG. 10(b)) generated by the saw-tooth wave generating circuit 52 is input to the inverting input terminal of the analog comparator 53.

The saw-tooth wave generating circuit 52 generates the saw-tooth wave at a time in a certain cycle previously set (the time which each rise edge occurs). The analog comparator 53 outputs a signal (FIG. 10(c)) which has a logical value H when the output from the D/A converter 51 is equal to or larger than the saw-tooth wave output from the saw-tooth wave generating circuit 52, and a logical value L when the output from the D/A converter 51 is smaller than the saw-tooth wave. Thus, the rise edge position represented by the output from the analog comparator 53 is determined as one of those represented by 256 steps according to the analog level output from the D/A converter 51.

Similarly, data Dh (FIG. 10(d)) output from the edge position change ROM 18B of the recording edge position calculating circuit 17 is converted from the digital form into the analog form by the D/A converter 61 to be supplied to the non-inverting input terminal of the analog comparator 63. The saw-tooth wave generating circuit 62 generates a saw-tooth wave (FIG. 10(e)) and supplies this wave to the inverting input terminal of the analog comparator 63. Then, the analog comparator 63 outputs a signal (FIG. 10(f)) which has a logical value H when the output from the D/A converter 61 is equal to or larger than the saw-tooth wave output from the saw-tooth wave generating circuit 62, and a logical value L when the output from the D/A converter 61 is smaller than the saw-tooth wave. Thus, the rise edge represented by the output from the analog comparator 63 varies by 256 steps according to the analog level output from the D/A converter 61. The OR gate 71 calculates the logical sum of the output of the analog comparator 53 (FIG. 10(c)) and the output of the analog comparator 63 (FIG. 10(f)) and supplies the calculated logical sum (FIG. 10(g)) to the gate of the flip flop 72. Each time a rise or fall edge is input to the gate, the flip flop 72 outputs a signal (FIG. 10(h)) formed by inverting the input logic. This signal output from the flip flop 72 determines the rise and fall edges of each pit by micro steps.

This signal is supplied to the mastering system 4. In the mastering system, disc 5 is cut in accordance with this signal. That is, learning data represented by micro steps is recorded on the disc 5.

Figure 9:
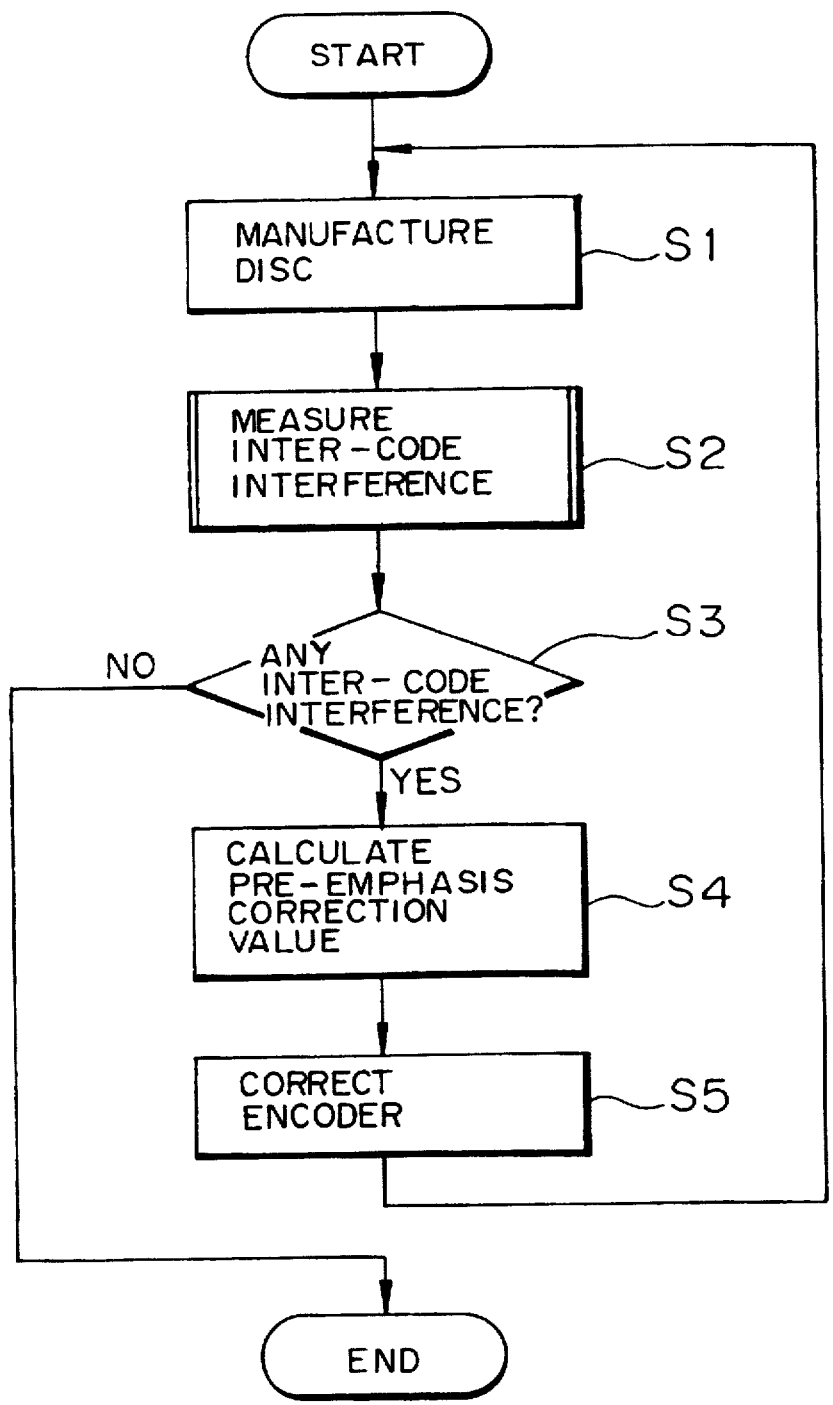
FIG. 9 is a flowchart of the operation of the embodiment shown in FIG. 2.
Figure 11:
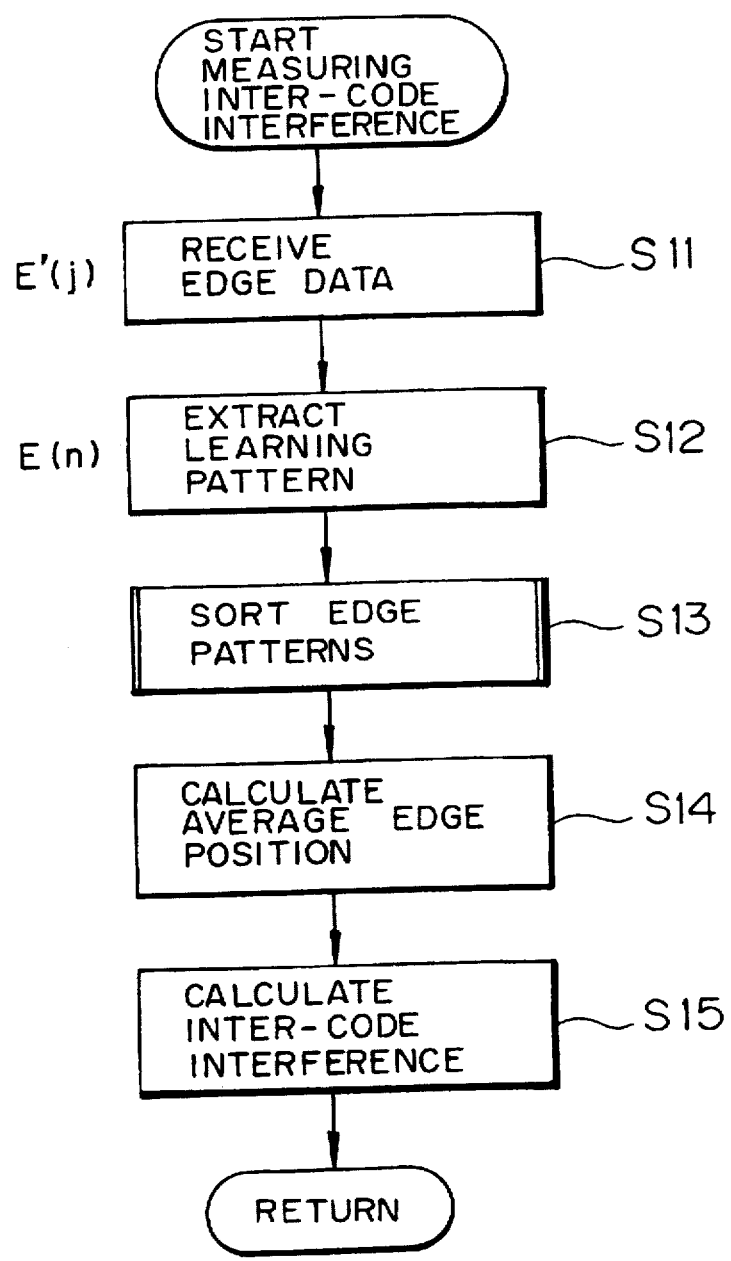
FIG. 11 is a flowchart of details of processing for measuring inter-code interference in step S2 of FIG. 9.

After the disc manufacturing step, i.e., step S1 of FIG. 9, has been completed in this manner, the process advances to step S2 to execute processing for measuring inter-code interference. FIG. 11 shows details of the processing for measuring inter-code interference.

First, in step S11, data is reproduced from the disc 5 by the player 6, and processing for obtaining edge data from the reproduced data is performed.

That is, the pickup 82 irradiates the disc 5 with laser light to reproduce data recorded on the disc 5. The RF signal (FIG. 12(a)) corresponding to the signal recorded on the disc 5 is amplified by the amplifier 83 and is then input to the spindle PLL circuit 84. The spindle PLL circuit 84 extracts the component corresponding to the above-mentioned macro step "8" (PLL lead-in signal) and controls the spindle motor 81 in synchronization with this component, thereby rotating the disc 5 at a certain speed previously set.

On the other hand, the clock reproducing circuit 88 extracts the PLL lead-in signal from the output of the amplifier 83 and generates clock A (FIG. 12(c), clock B (FIG. 12(d)) and clock C (FIG. 12(f)) in synchronization with this signal.

Clock A (FIG. 12(c)) has its rise edge generated by the timing corresponding to the rise and fall edge of pits. Clock B (FIG. 12(d)) has its rise edge generated by the same timing as the bias reference signal generation timing. Clock C (FIG. 12(f)) has its rise edge generated by the same timing as the gain reference signal generation timing.

The A/D converter 85 samples the RF signal input from the amplifier 83 in synchronization with clock A to obtain sampled 8-bit digital data (FIG. 12(b)), and supplies this data to the bias correcting circuit 86.

In the bias correcting circuit 86, the flip flop 101 holds the data of each edge in synchronization with clock A (FIG. 12(c)), and the flip flop 102 holds the data of the bias correction signal, i.e., the data corresponding to the reproduction level corresponding to the macro step "0", in synchronization with clock B (FIG. 12(d)).

The adder 103 subtracts the bias correction data held by the flip flop 102 from the reproduced data of each edge held by the flip flop 101 to obtain a subtraction output (FIG. 12(e)). The DC component of the reproduction signal is thereby canceled.

The output from the adder 103 is supplied to the flip flops 111 and 112 of the gain correcting circuit 87. The flip flop 111 holds the input data corresponding to each edge in synchronization with clock A (FIG. 12(c)) while the flip flop 112 holds the gain correction data after bias correction (reproduction level corresponding to "7") in synchronization with clock C (FIG. 12(f)).

The adder 7 subtracts the target amplitude $C_4$ output from the target amplitude generating circuit 114 from the reproduction level of the gain correction signal held by the flip flop 112 to obtain differential data, and outputs the differential data to the gain-variable amplifier 113. The gain-variable amplifier 113 adjusts the gain (level) of the data of each edge supplied from the flip flop 111 to the value corresponding to the differential data input from the target amplitude generating circuit 114, and outputs the data (FIG. 12(g)) to the adder 115.

The level of the data (FIG. 12(g)) output from the gain-variable amplifier 113 is thereby set so as to equal to the value corresponding to the target amplitude $C_4$ set by the target amplitude generating circuit 114.

In the adder 115, the output from the gain-variable amplifier 113 is added to the target bias $C_5$ output from the target bias generating circuit 116, and the result of this addition is obtained as the output of the gain correcting circuit 87 to be supplied to the inter-code interference measuring section 21 of the computer 7. Thus, the level corresponding to "0" is prevented from being reduced to an unnecessarily small value (negative value) as a result of cancellation of the DC component by the processing in the bias correcting circuit 86.

In the inter-code interference measuring section 21, 8-bit edge data (J items) transmitted from the gain correcting circuit 87 of the player 6 is successively substituted in a variable E' (j) ($1 \leq j \leq J$).

The process then advances to step S12 of FIG. 11 to execute processing for extracting learning patterns. That is, the edge data E' (j) received in step S11 contains the clock reference signal, bias reference signal and gain reference signal time-base-multiplexed as well as essential learning data. These signals are removed and only the above-described learning data (N items) is extracted to be substituted in a variable E(n) ($1 \leq n \leq N$).

The process then advances to step S13 to execute processing for sorting edge patterns of the learning patterns extracted in step S12. Details of this edge pattern sorting processing will be described with reference to the flowchart of FIG. 13.

First, in step S21, 0 is substituted in each of variables H (a, b, c), T (a, b, c), Kh (a, b, c), and Kt (a, b, c) to initialize the same. Each of values (a, b, c) changes eight steps from 0 to 7.

The process then advances to step S22 to set the variable n to 2. That is, with respect to sortable first edge, no sortable learning pattern (a pattern formed of three edges, i.e., a central edge and two adjacent edges before and after the central edge) is provided since no preceding edge information exists. Therefore, edge pattern sorting processing is started from the second edge data E(2).

Next, the process advances to step S23 to make a determination as to whether the edge data as a present processing object is sortable, that is, whether the value of n is equal to or smaller than N−1. (Learning pattern sorting is impossible with respect to the final (nth) because no adjacent edge exists after the final pattern, as it is with respect to the first edge before which no adjacent edge exists).

In this case, the variable n is 2, and is smaller than the value (N−1) smaller by 1 than the number N of learning data items. Then, the process advances to step S24 to make a determination as to whether E(n) (E(2) in this case) relates to a rise edge. For example, if the learning data is determined so as to start from a fall edge of a pit, even-number data is data on rise edges of pits while odd-number data is data on fall edges. In such a case, when n is an even number, E(n) is rise-edge data and the process advances to step S25. When n is an odd number, E(n) is fall-edge data and the process advances to step S26.

In step S25, examination is made to sort the edge data E(n) by determining the learning pattern to which the edge data E(n) relates. The information recorded on the disc 5 as learning data is known. Then, it is assumed here that learning data corresponding to each edge data E(n) is G(n). That is, the nth edge data E(n) is data obtained by reading the edge on which 3-bit learning data G(n) is recorded. On the edges adjacent to this, learning data G(n−1) and learning data G (n+1) are recorded.

Accordingly, edge data E(n) represents the position of the central edge of the learning pattern formed of three successive edges G(n−1), G(n) and G(n+1). Then, assuming that, for example, G(n−1)=a (=0, 1, 2, . . . 7), G(n)=b (=0, 1, 2, . . . 7) and G(n+1)=c (=0, 1, 2, . . . 7), edge data E(n) is added to variable H(a, b, c), and variable Kh(a, b, c) is incremented by 1. In this case, E(2) is added to H(a, b, c).

The process then advances to step S27 to increment variable n by 1 to set n=3 in this case.

Next, the process returns to step S23 to make a determination as to whether variable n is equal to or smaller than N−1. In this case, since n=3, the process again advances to step S24 to make a determination as to whether E(3) represents a rise edge. In this case, E(3) represents a fall edge, and the process advances to step S26. In Step S26, fall-edge data E(3) is added to variable T(a, b, c), and Kt(a, b, c) is incremented by 1.

The process then advances to step S27 to increment variable n by 1 to set n=4, and the process again returns to step S23.

Thus, processing from step S23 to step S27 is repeatedly executed. As a result, values obtained by adding the data on the rise edges are held as H(a, b, c) while values obtained by adding the data on the fall edges are held as variable T (a, b, c).

Figure 13:
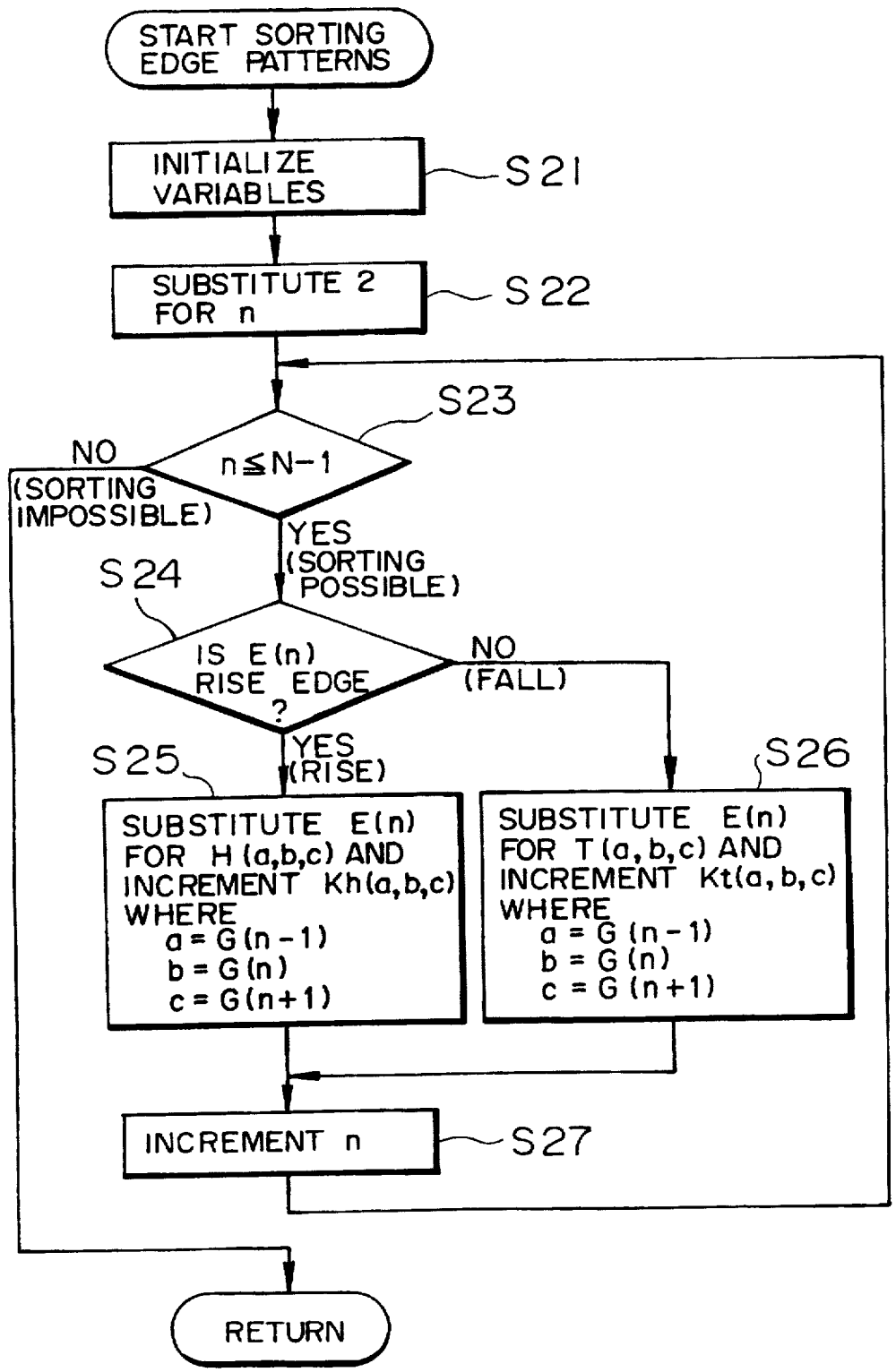
FIG. 13 is a flowchart of details of processing for sorting edge patterns in step S13 of FIG. 11.

If it is determined in step S23 that the value of variable n becomes larger than N−1 (if sorting of all edge patterns is completed), the process shown in the flowchart of FIG. 13 is finished.

Then, the process shown in FIG. 11 advances from step S13 to step S14 execute processing for calculating average edge positions.

By repeating the processing shown in FIG. 13, added values corresponding to learning patterns (0, 0, 0) to (7, 7, 7) are held as variables H(0, 0, 0) to H(7, 7, 7) and the number of the added learning patterns is held as corresponding Kh(0, 0, 0) to Kh(7, 7, 7). A similar result is obtained with respect to T(0, 0, 0) to T(7, 7, 7) and Kt(0, 0, 0) to Kt(7, 7, 7).

Then, an average value $H_0$(a, b, c) of the rise edge patterns and an average value $T_0$(a, b, c) of the fall edge patterns are calculated by the following equations:

$$H_0(a, b, c) = H(a, b, c)/Kh(a, b, c) \qquad (3)$$

$$T_0(a, b, c) = T(a, b, c)/Kt(a, b, c) \qquad (4)$$

It is possible to remove laser noise or electrical noise occurring randomly by averaging a plurality of measurement results with respect to one learning pattern H(a, b, c) or T(a, b, c) as described above.

Next, the process advances to step S15 to execute processing for calculating inter-code interference. Inter-code interference can be determined as a difference between the average edge position $H_0(a, b, c)$ or $T_0(a, b, c)$ of each learning pattern and the ideal position $Rh(b)$ or $Rt(b)$ of the central edge of the learning pattern.

The ideal positions $Rh(b)$ and $Rt(b)$ of the rise and fall edges are expressed by the following equations using central edge information b and constants $C_4$ and $C_5$ provided in the gain correcting circuit 87:

$$Rh(b)=C_6 \times b + C_5 \qquad (5)$$

$$Rt(b)=C_6 \times b + C_5 \qquad (6)$$

$C_6$ in these equations is expressed by the following equation:

$$C_6=C_4/7 \qquad (7)$$

As mentioned above, $C_4$ corresponds to the target amplitude output from the target amplitude generating circuit 114 shown in FIG. 8 while $C_5$ corresponds to the target bias output from the target bias generating circuit 116.

Accordingly, inter-code interference $Ih(a, b, c)$ corresponding to rise edge learning pattern $H(a, b, c)$ and inter-code interference $It(a, b, c)$ corresponding to fall edge learning pattern $T(a, b, c)$ can be expressed by the following equations:

$$Ih(a, b, c)=Rh(b)-H_0(a, b, c) \qquad (8)$$

$$It(a, b, c)=Rt(b)-T_0(a, b, c) \qquad (9)$$

The inter-code interference measuring section 21 calculates inter-code interference with respect to learning patterns (0, 0, 0) to (7, 7, 7) by the above equations (8) and (9).

When the inter-code interference measurement processing of Step S2 shown in FIG. 9 is completed in the above-described manner, the process advances to step S3 to make a determination as to whether the inter-code interference is within a certain reference range previously set. If inter-code interference exceeding the reference range exists (if inter-code interference is not sufficiently suppressed), the process advances to step S4 to execute processing for calculating the amount of correction by pre-emphasis.

That is, the pre-emphasis correction value calculating section 22 shown in FIG. 2 calculates the amount of correction by pre-emphasis from the data of inter-code interference output from the inter-code interference measuring section 21. First, the digital data $Ih(a, b, c)$ and $It(a, b, c)$ of inter-code interference obtained by the above equations are converted into data to be written to the ROM 18 of the recording edge position calculating circuit 17 of the encoder 3, i.e., the edge position change ROMs 18A and 18B shown in FIG. 3.

That is, one macro step at the time of recording is $C_1$ when expressed by 8 bits, as is apparent from equations (1) and (2). At the time of reproduction, it becomes $C_8$ in the 8-bit form, as is apparent from FIGS. 5 and 6. To convert the inter-code interferences expressed by equations (8) and (9) into values corresponding to the edge position change ROMs 18A and 18B, it is necessary to multiply each side of equations (8) and (9) by $C_1/C_6$. That is, the magnitudes of inter-code interference $Ieh(a, b, c)$ and $Iet(a, b, c)$ as seen from the encoder 3 can be expressed by the following equations:

$$Ieh(a, b, c)=(C_1/C_6) \times Ih(a, b, c) \qquad (10)$$

$$Iet(a, b, c)=(C_1/C_6) \times It(a, b, c) \qquad (11)$$

By using $Ieh(a, b, c)$ and $Iet(a, b, c)$ obtained by the above equations (10) and (11), the amount of correction by pre-emphasis is obtained as described below.

In this embodiment, because the amount of correction by pre-emphasis is converged by being updated several times, the amount of correction at the first time is set to a value smaller than the value for completely canceling the inter-code interference. That is, as expressed in equations shown below, values obtained by multiplying $Ieh(a, b, c)$ and $Iet(a, b, c)$ by a constant $\alpha$ ($0<\alpha<1$) are set as amounts of correction by pre-emphasis $Ph(a, b, c)$ and $Pt(a, b, c)$.

$$Ph(a, b, c)=\alpha \times Ieh(a, b, c) \qquad (12)$$

$$Pt(a, b, c)=\alpha \times Iet(a, b, c) \qquad (13)$$

When the amounts of correction by pre-emphasis are calculated as described above, the process advances from step S4 to step S5 to execute correction processing in the encoder 3. That is, processing for reflecting the amounts of correction by pre-emphasis in the contents of the edge position change ROMs 18A and 18B is executed.

If the content of the edge position change ROM 18A before correction is $F_{Ab}(h_{n-1}, t_{n-1}, h_n)$ and the content of the edge position change ROM 18B before correction is $F_{Bb}(t_{n-1}, h_n, t_n)$, then the content of the edge position change ROM 18A after correction, i.e., $F_{Aa}(h_{n-1}, t_{n-1}, h_n)$, and the content of the edge position change ROM 18B after correction, i.e., $F_{Ba}(t_{n-1}, h_n, t_n)$, are expressed by the following equations:

$$F_{Aa}(h_{n-1}, t_{n-1}, h_n)=F_{Ab}(h_{n-1}, t_{n-1}, h_n)+Pt(h_{n-1}, t_{n-1}, h_n) \qquad (14)$$

$$F_{Ba}(t_{n-1}, h_n, t_n)=F_{Bb}(t_{n-1}, h_n, t_n)+Ph(t_{n-1}, h_n, t_n) \qquad (15)$$

The contents of the edge position change ROMs 18A and 18B are updated as described above, thereby pre-emphasizing the output signal of the encoder 3 so that the measured inter-code interferences are canceled. That is, the position of each recording edge is corrected by being set to one of the edge positions determined by 256 steps. However, as mentioned above, there is a risk of occurrence of a new inter-code interference due to pre-emphasis. Then, the process returns from step S5 to step S1 to manufacture a new disc by using the encoder 3 in which the contents of the edge position change ROMs 18A and 18B have been updated. Processing from step 2 is repeated with respect to the newly manufactured disc.

The same processing is repeatedly executed until it is determined in step S3 that the inter-code interference is reduced to a value within a certain reference-value range previously set. When the value of inter-code interference falls into the reference-value range, the processing is stopped. That is, the values of the edge position change ROMs 18A and 18B are fixed.

Next, recording data output from the information source 1, to which error checking and correction codes have been added by the ECC circuit 11, is transformed into 3-bit data by the transformation circuit 12, and this data is supplied to the recording edge position calculating circuit 17 via the switch 16. In the switch 16, each of the outputs of the gain reference signal generating circuit 13, the bias reference signal generating circuit 14 and the PLL lead-in signal generating circuit 15 is selected as desired to be output as 4-bit data to the recording edge position calculating circuit 17. Thereafter, the recording data is recorded on disc 5 in the same manner as in the above-described case. Thus, a disc in which inter-code interference between data is sufficiently reduced can be obtained.

In the above-described embodiment, inter-code interference from each of two adjacent edges is limited or canceled.

However, it is also possible to limit or cancel inter-code interference from four or more adjacent edges by a similar method. For example, if the influence of two edges outside immediately-adjacent two edges should be considered, the arrangement may be such that learning patterns each formed of five successive patterns including the central edge are prepared, and inter-code interferences are measured with respect to the learning patterns to calculate the amounts of correction by pre-emphasis.

As the recording medium used in accordance with the present invention, magneto-optical discs and other recording mediums can be used as well as optical discs.

What is claimed is:

1. A method for recording data on a recording medium having a plurality of pits, each pit of said plurality of pits having at least one edge located in one of a plurality of locations, said method comprising the step of changing a respective location of said edge in a step-by-step manner using a first step width based on data to be recorded and the step of correcting said respective location using a second step width smaller than said first step width for reducing inter-code interference, said method further comprising the steps of:

recording uncorrected data on said recording medium;

reproducing said uncorrected data from said recording medium;

calculating a first value representing said inter-code interference from the reproduced data;

calculating a second value representing an amount of correction required by said second step width as a function of the calculated first value; and recording said data on said recording medium using the calculated second value.

2. The method according to claim 1, further comprising repeating said step of correcting and said step of recording said data until said first value becomes less than a predetermined reference value.

3. The method according to claim 2, wherein said second value is initially adjusted to be less than the calculated second value.

4. The method according to claim 3, wherein said uncorrected data initially includes learning data for determining a combination pattern of positions including said respective position and the respective positions of two adjacent edges before and after said edge, and wherein said learning data is reproduced for calculating said second value.

5. The method according to claim 4, further comprising repeating said step of calculating said first value with respect to said combination pattern for obtaining an average value representing said inter-code interference, wherein said average value is used as said first value.

6. Apparatus for recording data on a recording medium having a plurality of pits, each pit of said plurality of pits having at least one edge located in one of a plurality of locations, said apparatus comprising means for changing a respective location of said edge in a step-by-step manner using a first step width based on data to be recorded and for correcting said respective location using a second step width smaller than said first step width for reducing inter-code interference, said apparatus further comprising:

reproducing means for reproducing said data recorded on said recording medium;

inter-code interference calculating means for calculating a first value representing said inter-code interference from the reproduced data;

correction amount calculating means for calculating a second value representing an amount of correction required by said second step width as a function of the calculated first value; and recording means for recording said data on said recording medium using the calculated second value.

* * * * *